United States Patent
Sagane et al.

Patent Number: 4,812,548
Date of Patent: Mar. 14, 1989

[54] LIQUID CRYSTALLINE POLYMER

[76] Inventors: Toshihiro Sagane, 7 Presidential Apartments, Amherst, Mass. 01002; Robert W. Lenz, Polymer Science and Engineering Dept., University of Massachusetts, Amherst, Mass. 01003

[21] Appl. No.: 176,269

[22] Filed: Mar. 31, 1988

[51] Int. Cl.$^4$ .............................................. C08F 12/24
[52] U.S. Cl. .................................... 526/313; 526/299
[58] Field of Search ................................. 526/313, 299

[56] References Cited

FOREIGN PATENT DOCUMENTS 0109073  5/1984  European Pat. Off. ............ 526/313

Primary Examiner—C. Warren Ivy
Assistant Examiner—Alex H. Walker
Attorney, Agent, or Firm—Sherman & Shalloway

[57] ABSTRACT

A thermotropic polymer, having an optically anisotropic phase, comprises recurring units of the formula (1)

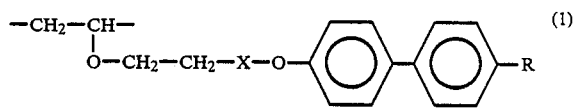

wherein R is a substantially linear organic substituent having a bulkiness factor greater than about 4 Å, and wherein X is a direct bond, $+O-CH_2\overline{)_n}$ (n being an integer of 1 to 8) or $+OCH_2CH_2\overline{)_m}$ (m=1, 2 or 3). The thermotropic polymer has a molecular weight distribution ($\overline{M}w/\overline{M}n$) of less than about 1.4.

11 Claims, 9 Drawing Sheets

LIQUID CRYSTALLINE POLYMER

BACKGROUND OF THE INVENTION

1. Field of the Invention

The present invention relates to liquid crystalline polyvinylethers. More particularly, it relates to polymers which exhibit an optical anisotropic phase.

2 Description of the Prior Art

The work of Krigbaum et al (Mol. Cryst. Liq. Cryst., 1980, 62, 87) on main-chain and Finkelmann et al. (Makromol. Chem., 1978, 179, 273) and Ringsdorf et al. (Br. Polym. J., 1981, 13, 43) on side-chain polymer liquid crystals has generated interest in the potential of these systems for use in electrooptic devices.

Side-chain liquid crystalline polymers can be prepared by three different routes, i.e. addition polymerization, condensation polymerization and post-reactions of polymers (Finkelmann, Polymer Liquid Crystals, A. Ciferri, W. R., Krinbaum and Robert B. Meryer, Eds., Academic Press, New York (1982), Chapter 2). Among the three methods, the most convenient approach is to introduce the mesogenic unit beforehand into a reactive monomer capable of undergoing addition or chain-growth polymerization. However, for the most part, the side-chain liquid crystalline polymers prepared by chain-growth polymerization have been limited to polymethacrylates and polyacrylates (Finkelmann et al., Adv. Poly. Sci., 60/61, 99 (1984); Shibaev et al. Adv. Poly. Sci., 60/61, 173 (1984)) and polystyrene derivatives (Percec et al., Poly. Bull., 17, 347 (1984)), and these investigations were generally not concerned with the control of or the effect of molecular weight distribution on the properties of the liquid crystalline polymer. One example of such an investigation is the preparation of polymethacrylates by group-transfer polymerization (Kreuder et al., Makromol Chem. Rapid Commun., 7, 5 (1986)), but the molecular weight distribution range of these polymers was still quite broad ($\overline{M}w\overline{M}n = 1.2$–$1.8$).

Higashimura and co-workers developed a living cationic polymerization procedure for vinyl ethers and propenyl ethers using an $HI/I_2$ initiator system (Miyamoto et al., Macromolecules, 17, 265 (1984); Enoki et al., J. Poly. Sci., Poly. Chem. Ed., 24, 2261 (1986); Higashimura et al., J. Poly. Sci., Poly. Chem. Ed., 22, 3173 (1984); Higashimura et al., Macromolecules, 18, 611 (1985); Higashimura et al., Makromol. Chem. Suppl., 12, 153 (1985); Higashimura et al., U.S. Pat. No. 4,696,988). By this technique, in contrast to conventional cationic polymerization, even vinyl ethers containing polar groups polymerized in a polar solvent, such as $CH_2Cl_2$ can form living polymers.

The cationic polymerization of 2-(4-biphenyloxy) ethyl vinyl ether and 2-(4'-methoxy-4-biphenyloxy) ethyl vinyl ether with conventional Lewis-acids has been reported (Rodriguez-Parada et al., J. Poly. Sci., Poly. Chem. Ed., 24, 1363 (1986)). However, these reactions yielded polymers with broad molecular weight distributions.

SUMMARY OF THE INVENTION

The object of the present invention is to provide poly(2-(4'-substituted-4-biphenyloxy) ethyl vinyl ethers) and their derivatives which are thermotropic, wherein the 4'-substituent is a substantially linear organic substituent having a bulkiness factor of greater than about 4 Å, and the poly(2-(4'-substituted-4-biphenyloxy) ethyl vinyl ethers) and their derivatives have a molecular weight distribution ($\overline{M}w/\overline{M}n$) of less than about 1.4.

The polymers are capable of forming an optically anisotropic phase.

The polymers may be used as matrix materials for nonlinear optical systems, for information storage and retrieval, for light valves, for displays, and for a variety of other applications essentially identical to those for which small molecule liquid crystals are of use.

BRIEF DESCRIPTION OF THE DRAWING FIGURES

DETAILED DESCRIPTION OF THE INVENTION

Figure 1:
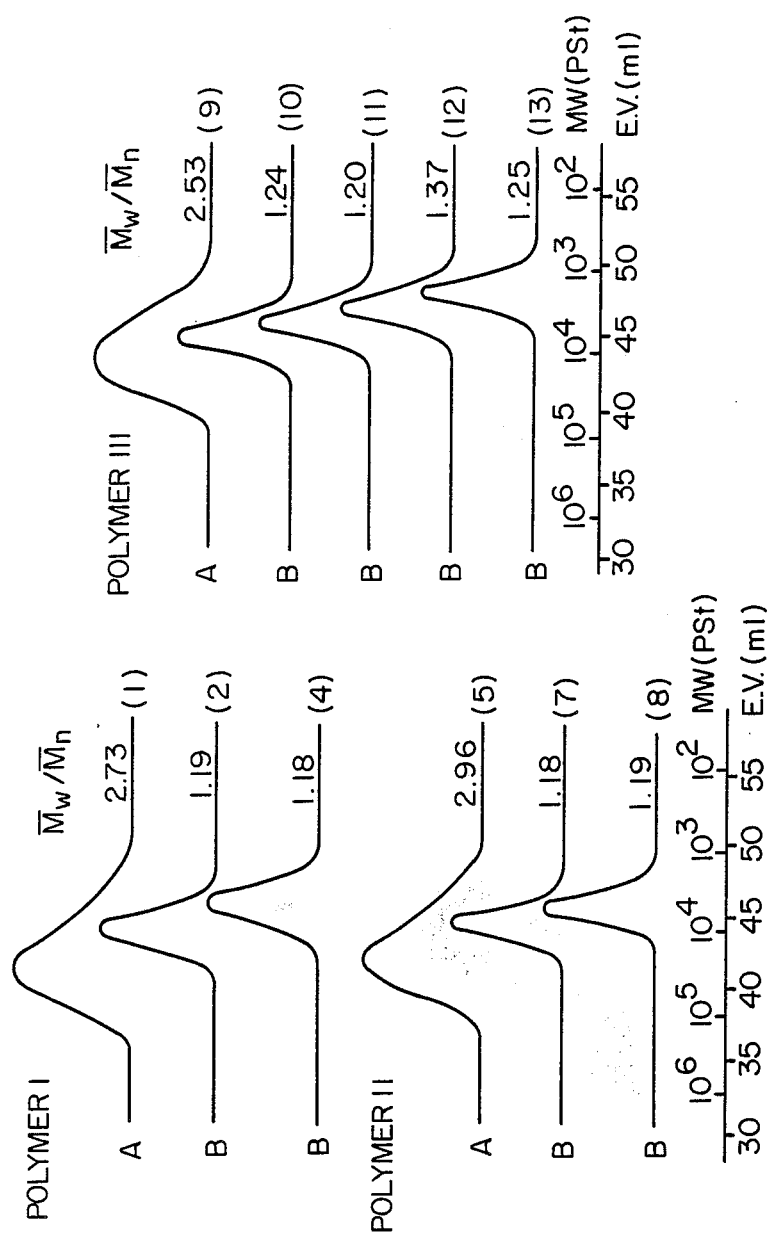
FIG. 1 shows the molecular weight distributions of Polymers I, II and III.

The present invention relates to the provision of a thermotropic polymer capable of forming an optically anisotropic phase comprising recurring units of formula (1)

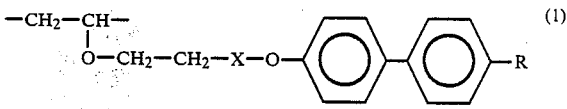

wherein R is a substantially linear organic substituent having a bulkiness factor greater than about 4Å, and X is a direct bond, $-O-(CH_2)_{\overline{n}}$ (wherein n is an integer of 1 to 8) or $-(OCH_2CH_2)_{\overline{m}}$ (wherein m is an integer of 1 to 3), said polymer having a molecular weight distribution ($\overline{M}w/\overline{M}n$ of less than about 1.4.

2-(4'-Substituted-4-biphenyloxy) ethyl vinyl ethers and their derivatives which can be cationically polymerized to form the recurring units of formula (I), above, include 2-(4'-methoxy-4-biphenyloxy) ethyl vinyl ether, 2-(4'-ethoxy-4-biphenyloxy) ethyl vinyl ether and 2-(4'-hexoxy-4-biphenyloxy) ethyl vinyl ether, and 2-(4'-cyano-4-biphenyloxy) ethyl vinyl ether.

These monomers can be prepared by the phase transfercatalyzed condensation of 2-chloroethyl vinyl ether (A) with the corresponding 4-(4'-substituted phenyl) phenol (B) or sodium salt of 4-(4'-substituted phenyl) phenol derivatives (E) in the presence of a catalytic amount of tetrabutylammonium hydrogen sulfate, as disclosed in Rodriguez-Parada et al., J. Poly. Sci., Poly. Chem. Ed., 24, 1363 (1986) and shown below:

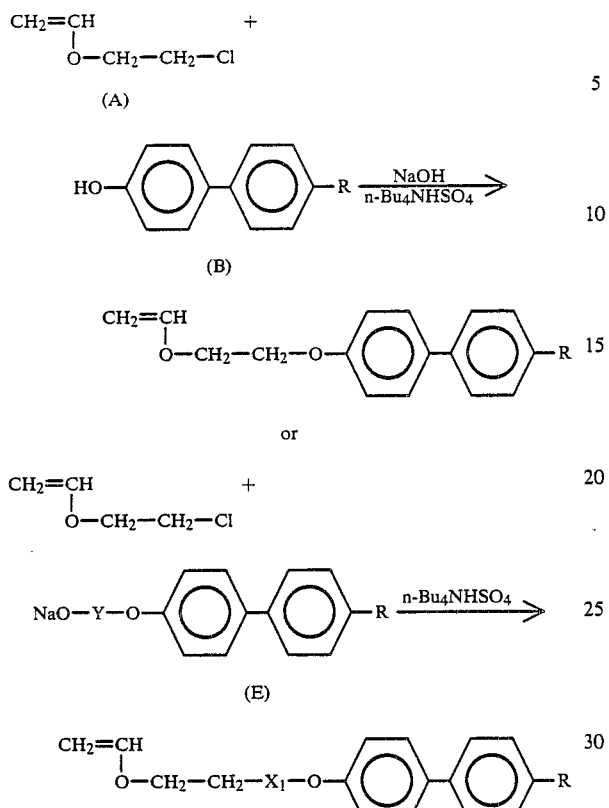

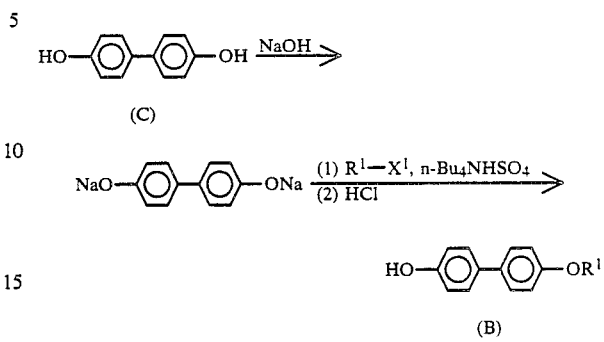

wherein R is as defined above, $R^1$ is an alkyl group and $X^1$ is Br or Cl.

The reactant (E), i.e. the sodium salt of 4-ω-hydroxyalkoxy-4'-alkoxy-biphenyl may be obtained by the reaction of 4-(4'-alkoxy phenyl) phenol with the corresponding δ-chloro-ω-hydroxy-alkane in the presence of sodium hydroxide and a catalytic amount of tetrabutylammonium hydrogen sulfate and subsequent treatment with sodium metal, as shown below:

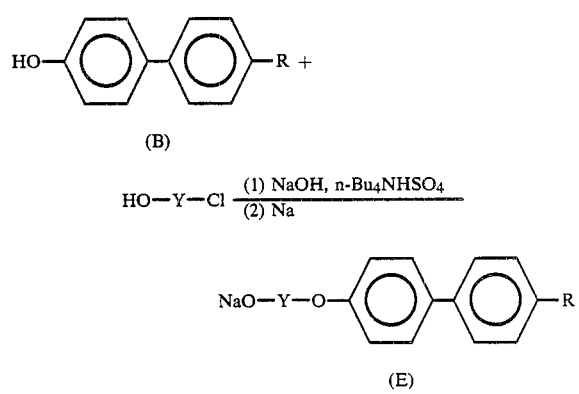

wherein R is a substantially linear organic substituent having a bulkiness factor greater than about 4Å, Y is $-(CH_2)_n-$ (n being an integer of 1 to 8) or $-(OCH_2CH_2)_m-$ (m being 0, 1 or 2), and $X_l$ is $-(OCH_2)_n-$ (n being an integer of 1 to 8) or $-(OCH_2CH_2)_m-$ (m being 1, 2 or 3). The monomers may be purified by recrystallization from methanol.

The reactant (B), i.e. 4-(4'-alkoxy phenyl) phenol may be obtained by the reaction of 4-(4'-hydroxy phenyl) phenol (C) with the corresponding dialkyl sulfate in the presence of NaOH and subsequent acidification with a mineral acid, such as HCl, as shown below:

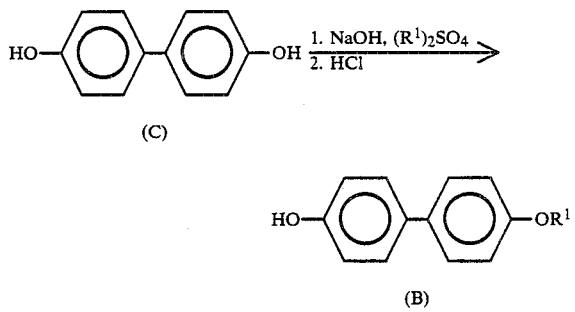

wherein R is as defined above and $R^1$ is an alkyl group.

Alternatively, the reactant (B), i.e. 4-(4'-alkoxy phenyl) phenol, may be obtained by the reaction of 4-(4'-hydroxy phenyl) phenol (C) with sodium hydroxide to form the disodium salt of the 4-(4'-hydroxy phenyl) phenol; followed by the reaction of the disodium salt of the 4-(4'-hydroxy phenyl) phenol with the corresponding alkyl halide in the presence of a catalytic amount of tetrabutylammonium hydrogen sulfate; and subsequent acidification with a mineral acid, such as HCl, as shown below:

wherein R is as defined above and Y is $-(CH_2)_n-$ (n being an integer of 1 to 8) or $-CH_2CH_2-(OCH_2CH_2)_m-$ (m being 0, 1 or 2).

The reactant 4-hydroxy-4'-cyano-biphenyl may be prepared by the synthesis route described in Ed. by J. F. Johnson and R. S. Porter "Liquid Crystals and Ordered Fluids", Vol. 2, pp. 636–641, Plenum Press, New York (1974). In particular, 4nitrobiphenyl is reacted with bromine to form 4-nitro-4'-bromobiphenyl, which is then reduced with tin, in the presence of a mineral acid, such as HCl, and subsequently treated with sodium hydroxide to form 4-amino-4'-bromo-biphenyl, which is reacted with acetic acid, in the presence of a strong acid, such as $H_2SO_4$, to form 4-hydroxy-4'-bromo-biphenyl, which is then contacted with cuprous cyanide to form the 4-hydroxy-4'-cyanobiphenyl, as shown below:

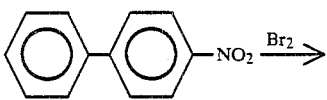

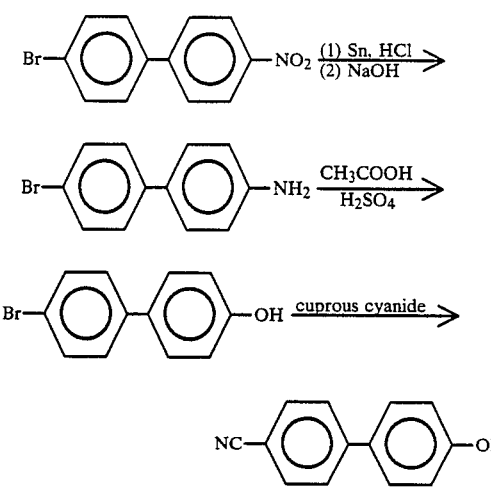

The initiator systems used for the preparation of the polymers according to the present invention are mixtures of hydrogen iodide and at least one member selected from iodine, zinc iodide, zinc bromide and zinc chloride. Preferred initiators are a mixture of hydrogen iodide and iodine or a mixture of hydrogen iodide and zinc iodide. A suitable hydrogen iodide to iodine molar ratio is from about 0.5/1 to about 100/1, preferably from 0.8/1 to 60/1. A suitable hydrogen iodide to zinc iodide molar ratio is from 5/1 to 60/1.

A suitable amount of hydrogen iodide is from 0.01 to 0.30 mol per mol of the monomer, preferably 0.02 to 0.25 mol per mol of the monomer. The molecular weight of the polymer can be controlled by controlling the amount of hydrogen iodide relative to the amount of the monomer.

The polymerization reaction is preferably conducted in a solvent. Suitable solvents include aromatic hydrocarbons and halogenated hydrocarbons. Examples of suitable solvents include benzene, toluene, dichloromethane and 1,2-dichloroethane.

The living polymerization reaction is generally carried out at a temperature from −100° C. to +50° C., preferably, from −50° C. to 0° C. by HI/I$_2$, from −50° C. to 50° C. by HI/ZnI$_2$ in aromatic hydrocarbon solvents, from −50° C. to 0° C. by HI/ZnI$_2$ in halogenated hydrocarbon solvents. If the polymerization temperature is higher than the upper limit, above, living polymerization does not occur, and the so-produced polymer has a broad molecular weight distribution. On the other hand, if the polymerization temperature is below the lower limit, above, an appreciable polymerization rate cannot be obtained.

The polymerization is generally carried out to about 100% conversion of monomer, usually taking between a couple of hours and a couple of days, preferably 2–24 hours (higher temperatures requiring less time and vice versa).

The thermotropic polymer of the present invention comprises recurring units of the formula (1)

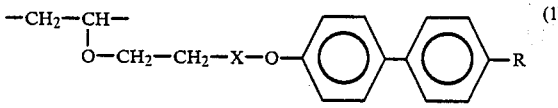

wherein R is a substantially linear organic substituent having a bulkiness factor greater than about 4Å, and X is a direct bond, $-O\text{-}(CH_2\text{-})_n$ (n being an integer of 1 to 8) or $-(OCH_2CH_2\text{-})_m$ (m being 1, 2 or 3) and said polymer has a molecular weight distribution of less than about 1.4.

By the "bulkiness factor" is meant the distance from the center of the carbon atom at the 4′-position of the biphenyl moiety to the end of the substituent. In other words, the bulkiness factor is equal to the sum of the bond lengths in the substantially linear backbone of the substituent plus the van der Waal's radius of the end atom. The bulkiness factors for several organic moieties are illustrated in Table I.

TABLE I

| Substituent at the 4-position | Bulkiness factor (Å) |
|---|---|
| $-H$ | 2.3 |
| $-C\equiv N$ | 4.2 |
| $-OCH_3$ | 5.1 |
| $-OC_2H_5$ | 6.6 |
| $-OC_6H_{13}$ | 12.8 |

Suitable substantially linear organic substituents having a bulkiness factor greater than about 4 Å include the cyano group and alkoxy groups such as methoxy, ethoxy, hexoxy, actoxy, decoxy, etc., preferably alkoxy groups of 1–6 carbon atoms such as methoxy, ethoxy and hexoxy. Substantially linear organic substituents having a bulkiness factor of about 32 Å constitute a practical upper limit for the invention (although larger factors could be used) since the materials necessary for the production of the monomers, e.g., alkyl halides of the formula $CnH_{2n+1}X^1$, where $X^1 =$ Br or Cl, are not readily commercially available for n greater than 18. Thus, $R = -OC_{18}H_{37}$ (bulkiness factor = 31.3 Å) constitutes the practical upper limit.

The molecular weight distribution ($\overline{Mw}/\overline{Mn}$), as determined by gel permeation chromatography (GPC), should be less than about 1.4, preferably less than about 1.3, most preferably less than about 1.2.

The present invention is described below in greater detail with reference to the following examples.

PREPARATION EXAMPLES

A. Preparation of 2-(4-biphenyloxy) ethyl vinyl ether (I) and 2-(4'-methoxy-4-biphenyloxy) ethyl vinyl ether (III)

As described in Rodriguez-Parada et al., J. Poly. Sci., Poly. Chem. Ed., 24, 1363 (1986), 2-chloroethyl vinyl ether was reacted with either 4-phenylphenol or 4-(4'-methoxyphenyl) phenol in the presence of a catalytic amount of tetrabutylammonium hydrogen sulfate to produce 2-(4-biphenyloxy) ethyl vinyl ether (I) or 2-(4'-methoxy-4-biphenyloxy) ethyl vinyl ether (III), respectively. The monomers were purified by recrystallization from methanol. The melting points and chemical shifts of the $^1$H-NMR spectra were determined, and these are summarized in Table 1. Melting points were determined by differential scanning calorimetry on a Perkin-Elmer DSC-2 instrument with samples of about 10 mg under a nitrogen atmosphere at a scanning rate of 10° C./min. Indium and naphthalene were used for the calibration of the temperature scale. The $^1$H-NMR spectra was obtained with a Varian XL-200 spectrometer in CDCl$_3$ at room temperature.

B. Preparation of 2-(4-biphenylcarboxy) ethyl vinyl ether (II)

As described in Kato et al., J. Poly. Sci., Part A-1, 9, 2109 (1971) and Watanabe et al., J. Poly. Sci., Poly. Chem. Ed., 22, 2801 (1984), 2-chloroethyl vinyl ether was reacted with sodium-4-phenylbenzoate in the presence of a catalytic amount of tetrabutylammonium iodide to produce 2-(4-biphenylcarboxy) ethyl vinyl ether (II). The monomer was purified by recrystallization from methanol. The melting points and chemical shifts of the $^1$H-NMR spectra were determined, as for monomers (I) and (III), above, and these are also summarized in Table 1.

TABLE 1
Characterization of the Monomers

| Monomer | Tm[1] (°C.) | Td[2] | Tc[2] | $^1$H—NMR Chemical Shift δ(ppm) | Proton[3] | Ratio |
|---|---|---|---|---|---|---|
| (I) | 79 | — | 63 | 3.90~4.40 (m) | a,c,d | 6 |
|  |  |  |  | 6.55 (d of d) | b | 1 |
|  |  |  |  | 6.95~7.10 (m) | e | 2 |
|  |  |  |  | 7.25~7.70 (m) | f,g,h,i | 7 |
| (II) | 76 | — | 37 | 4.05~4.25 (m) | a,c | 4 |
|  |  |  |  | 4.60 (m) | d | 2 |
|  |  |  |  | 6.53 (d of d) | b | 1 |
|  |  |  |  | 7.35~7.50 (m) | h,i | 3 |
|  |  |  |  | 7.60~7.70 (m) | f,g | 4 |
|  |  |  |  | 8.10~8.15 (m) | e | 2 |
| (III) | 121 | 109[4] | 105[4] | 3.82 (s) | i | 3 |
|  |  |  |  | 3.90~4.35 (m) | a,c,d | 6 |
|  |  |  |  | 6.55 (d of d) | b | 1 |
|  |  |  |  | 6.85~7.05 (m) | h,e | 4 |
|  |  |  |  | 7.40~7.55 (m) | f,g | 4 |

[1]Determined by DSC (Taken from the 2nd heating cycle thermogram).
[2]Determined by DSC (Taken from the 1st cooling cycle thermogram).
Td: Deisotropization temp.; Tc: Recrystallization temp.

[3]
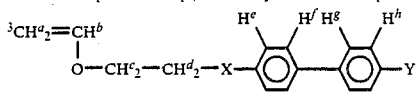

I: X = O ; II: X = OC(= O); III: X = O
Y = H[1]    Y = H[i]           Y = OCH[i]$_3$

[4]Monotropic liquid crystalline phase was identified with the polarizing microscope (mosaic texture characteristic of smectic phase was observed.)

POLYMERIZATION EXAMPLES

Unless otherwise specified, all polymerization examples were conducted in the following manner.

The hydrogen iodide (HI), iodine (I$_2$) and boron trifluoride etherate (BF$_3$OEt$_2$) initiators and the solvents (toluene, dichloromethane and n-hexane) were purified and used as reported in Miyamoto et al., Macromolecules, 17, 265 (1984).

The zinc iodide (ZnI$_2$, Aldrich Chemical Co., purity > 99.99%) was used as received without further purification as reported as Sawamoto et al., Macromolecules, 20, 2693 (1987).

Cationic polymerization reactions were carried out in pre-dried Schlenk tubes equipped with a three-way stopcock under a dry nitrogen atmosphere after the solid monomer has been degassed. The reactions with BF$_3$OEt$_2$ were carried out by adding the initiator in solution to a solution of the monomer in the reaction solvent. For the HI/I$_2$ and HI/ZnI$_2$ initiators, an HI solution in n-hexane was added to a solution of the monomer in the reaction solvent and an iodine solution in the reaction solvent or a ZnI$_2$ solution (in diethyl ether) were then added to this mixture to initiate polymerization. Reactions were terminated by the addition of cold ammoniacal methanol. The quenched polymerization solution was diluted with a portion of n-hexane and, for removing the initiator residues, it was washed with 10% aqueous sodium thiosulfate solution and then water for HI/I$_2$ or HI/ZnI$_2$ initiators, or water only for BF$_3$OEt$_2$. The washed solution was then evaporated under reduced pressure below 40° C. to give product polymers. All polymers were purified by precipitation from CH$_2$Cl$_2$ solutions into methanol and were dried in vacuum.

The molecular weight distribution of the polymer was measured by GPC in CHCl$_3$ on Waters Associates, Inc., liquid chromatograph equipped with five polystyrene gel columns (8 mm×23 cm each; Ultrastyragel TM; linear exclusion limits of the five columns are $5 \times 10^3$, $5 \times 10^3$, $8 \times 10^4$, $5 \times 10^5$, $6 \times 10^6$) and a refractive index (RI) detector. The number-average molecular weight ($\overline{Mn}$) was calculated with the use of a polystyrene calibration curve. $^1$H- and $^{13}$C-NMR spectra were obtained with Varian XL-200 and XL-300 spectrometers in CDCl$_3$ at room temperature. In the $^{13}$C-NMR spectra of the polymers, the absorptions of the methylene (—CH$_2$—) and the methine (—CH—) carbons in the main chain structure appear at 40.9, 39.2 (—CH$_2$—) and 74.9 ppm (—CH—) for Polymer I; 40.6, 39.2 (CH$_2$—) and 74.1 ppm (—CH—) for Polymer II; 41.4, 40.8 (—CH$_2$—) and 74.1 ppm (—CH—) for Polymer III. The spectra also show that the signals of the pendant groups containing oxyethylene unit (—CH$_2$—CH$_2$—O—), ethylene ester unit (—CH$_2$—CH$_2$—O—C(=O)—) and biphenyl group are exactly the same as those of corresponding monomers. All polymers also showed the expected $^1$H-NMR spectra.

Thermal analysis was carried out on a Perkin-Elmer DSC2 instrument with polymer samples of about 10 mg under a nitrogen flow at a scanning rate of 10° C./min. Indium and naphthalene were used for the calibration of the temperature scale. The melt behavior of the polymers was visually observed using a capillary melting point apparatus and a polarizing microscope equipped with cross-polarizers and a hot stage.

EXAMPLES I-III

Cationic polymerizations of 2-(4-biphenyloxy) ethyl vinyl ether having the formula (I)

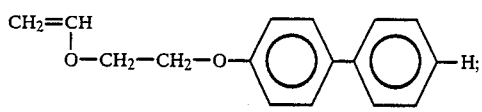

2-(4-biphenylcarboxy) ethyl vinyl ether having the formula (II)

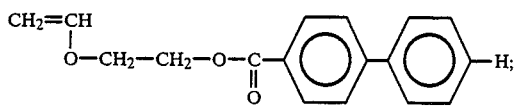

and 2-(4'-methoxy-4-biphenyloxy) ethyl vinyl ether having the formula (III)

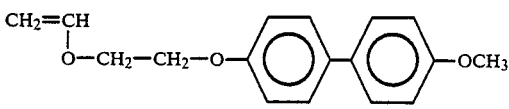

were carried out using $BF_3OEt_2$ and $HI/I_2$ initiator systems under the conditions set forth in Table 2 (wherein $[M]_0 = $ *initial monomer charge, M = mol, mM = millimole*).

tionally to the monomer-to-initiator feed molar ratio ($[M]_O/[HI]_O$) and to the molar ratio of monomer consumed to initiator. The calculated $\overline{M}n$ values of the polymers are given in Table 2.

Figure 2:
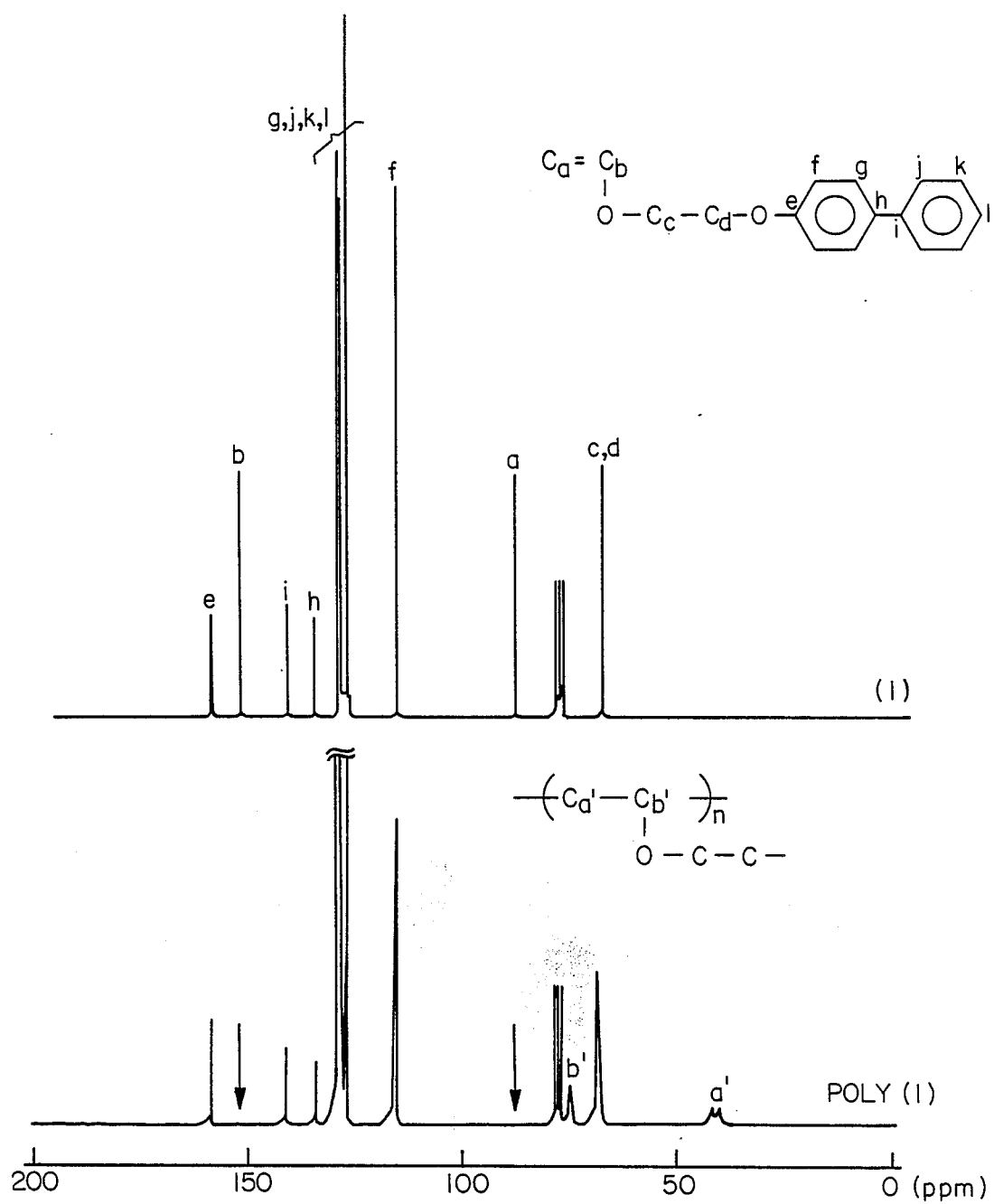
FIG. 2 shows the $^{13}C$-NMR spectra of monomer (I) and Polymer (I).
Figure 3:
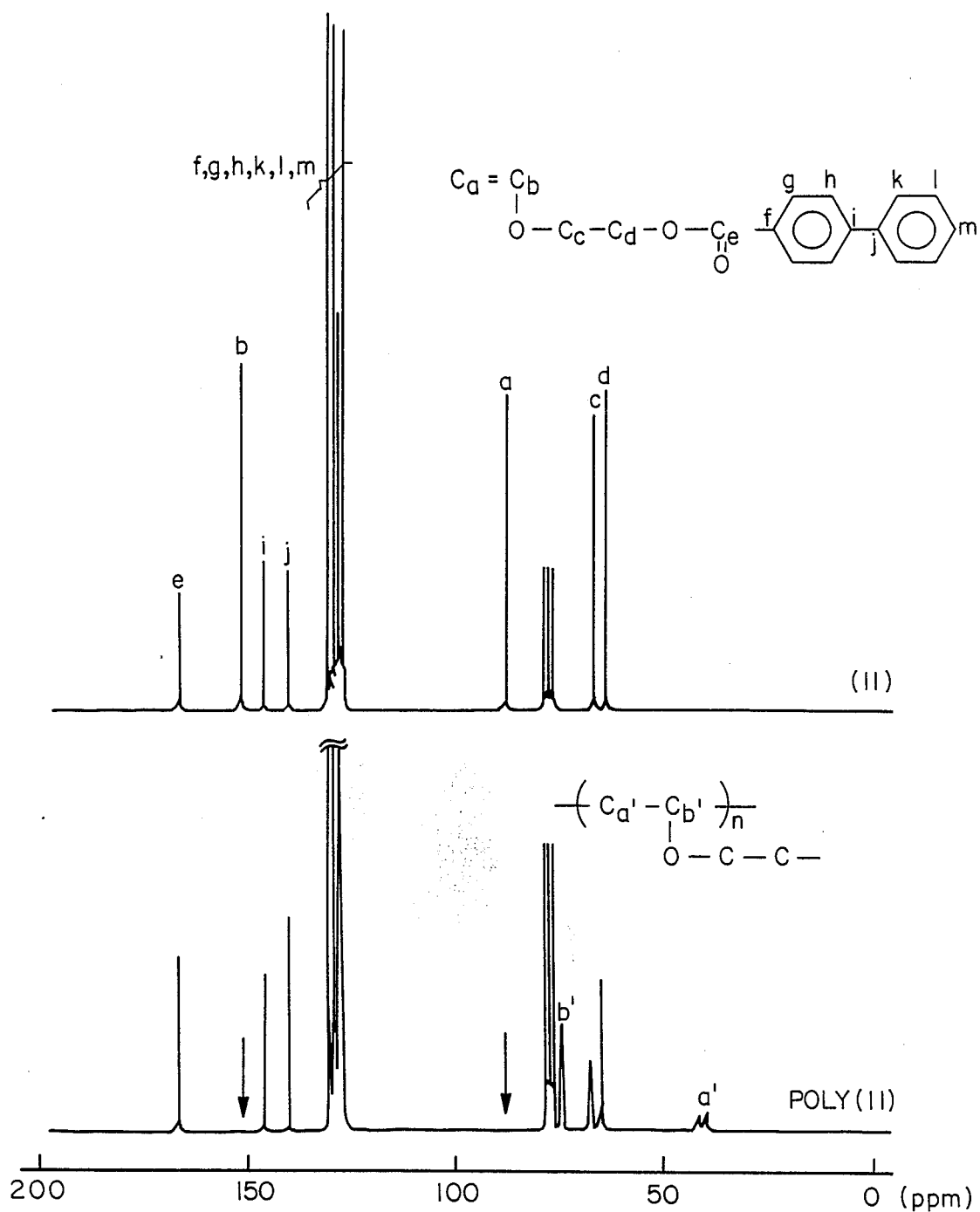
FIG. 3 shows the $^{13}C$-NMR spectra of monomer (II) and Polymer (II).
Figure 4:
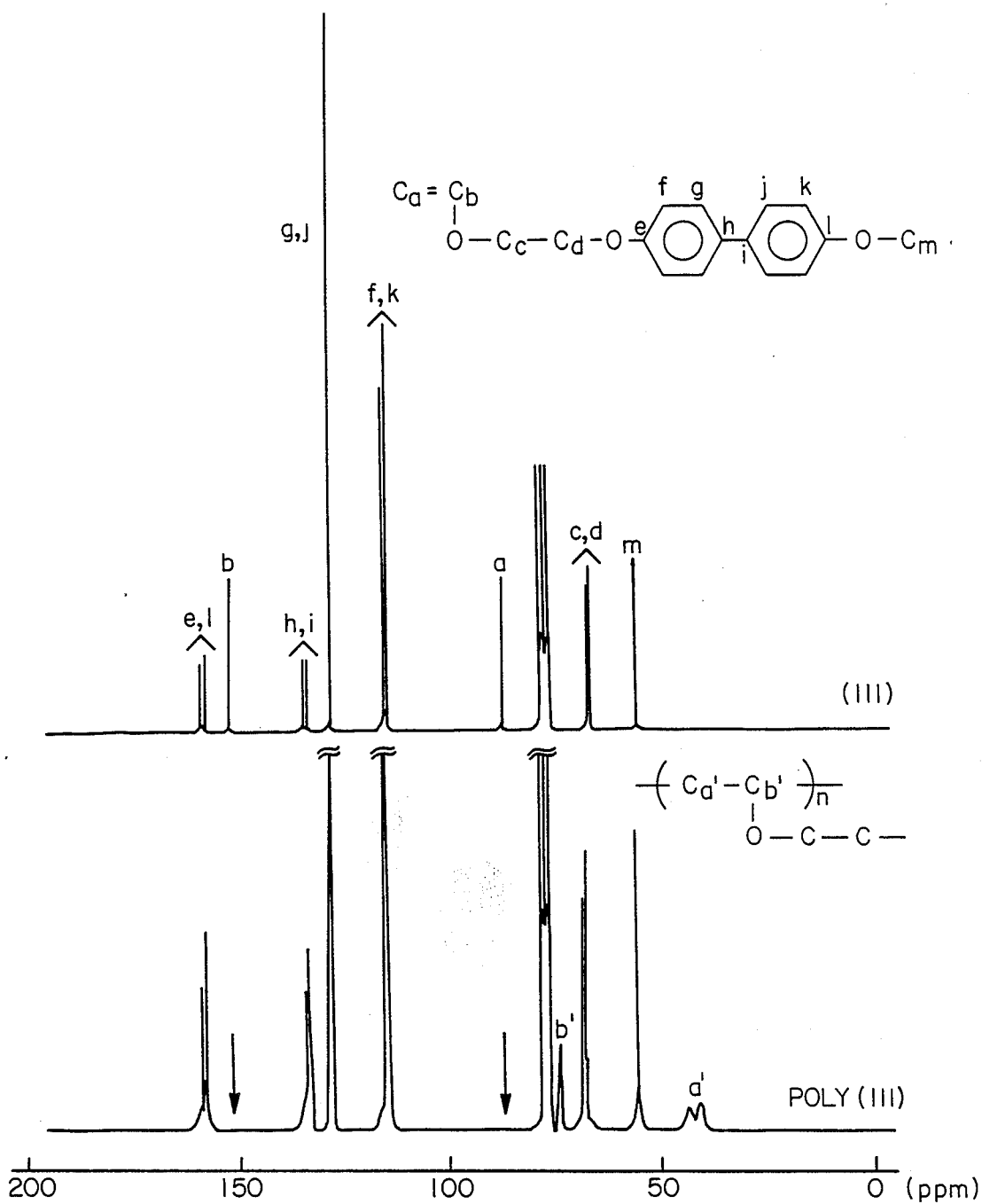
FIG. 4 shows the $^{13}C$-NMR spectra of monomer (III) and Polymer (III).

To verify the polymer structures obtained, $^{13}C$-NMR spectra were taken for all products. FIGS. 2, 3 and 4 contain the $^{13}C$-NMR spectra of Polymers (I), (II), and (III), respectively, together with those of the corresponding monomers.

From these results, it is seen that monomers (I), (II), and (III), in spite of having bulky substituents, could be readily polymerized by the $HI/I_2$ initiator system in the same manner as other vinyl ethers, to form polymers of the expected structure:

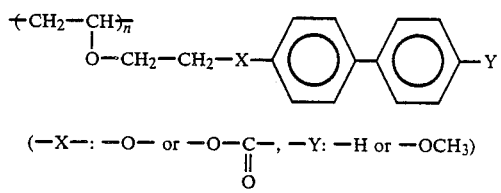

$(-X-: -O-$ or $-O-C-$, $-Y: -H$ or $-OCH_3)$
$\phantom{(-X-: -O-\text{ or } -O-}\|$
$\phantom{(-X-: -O-\text{ or } -O-}O$

Thermal Properties of the Polymers

The thermal properties of Polymers (I), (II), and (III), as determined by DSC and by the use of a hot stage of a polarized light microscope, are described below.

Polymers I and II

Typical DSC thermograms of Polymers I and II

TABLE 2

Cationic Polymerization of Monomers (I), (II) and (III)[a]

| Sample No. | Monomer | Initiator (mM), Solvent[b] | $[M]_0$ (M) | Reaction Time (Hr) | $\overline{M}n \times 10^{-3}$ Calcd.[c] | Obsvd.[d] | $\overline{M}w/\overline{M}n$ |
|---|---|---|---|---|---|---|---|
| (1) | (I) | $BF_3OEt_2$(10.0)T | 0.17 | 1.5 | — | 18 | 2.7 |
| (2) | (I) | $HI/I_2$(5.9/0.2)D | 0.25 | 48 | 10.2 | 12 | 1.2 |
| (3) | (I) | $HI/I_2$(8.4/10.0)T | 0.20 | 18 | 5.7 | 6.5 | 1.2 |
| (4) | (I) | $HI/I_2$(10.3/0.2)D | 0.21 | 2 | 4.9 | 5.4 | 1.2 |
| (5) | (II) | $BF_3OEt_2$(2.5)T | 0.15 | 3 | — | 11 | 3.0 |
| (6) | (II) | $HI/I_2$(8.9/0.2)D | 0.21 | 70 | 6.3 | 8.5 | 1.3 |
| (7) | (II) | $HI/I_2$(10.0/10.0)T | 0.21 | 48 | 5.6 | 7.6 | 1.2 |
| (8) | (II) | $HI/I_2$(20.0/20.0)T | 0.21 | 48 | 2.9 | 4.8 | 1.2 |
| (9) | (III) | $BF_3OEt_2$(2.5)T | 0.06 | 3 | — | 6.7 | 2.5 |
| (10) | (III) | $HI/I_2$(4.3/0.2)D | 0.11 | 162 | 6.9 | 6.0 | 1.2 |
| (11) | (III) | $HI/I_2$(2.9/3.0)T | 0.06 | 408 | 4.8 | 4.3 | 1.2 |
| (12) | (III) | $HI/I_2$(10.3/0.2)D | 0.11 | 3 | 2.9 | 2.4 | 1.4 |
| (13)[e] | (III) | $HI/I_2$(13.1/10.0)T | 0.11 | 24 | 2.3 | 1.8 | 1.3 |

[a] All reaction conversions were close to 100% except for Sample No. 11, which was 85%.
[b] Reaction solvents: T, toluene, D, dichloromethane.
[c] Calcd. $\overline{M}n = $ (MW of monomer) $\times$ ([M] consumed/$[HI]_O$).
[d] Determined by GPC calibrated with standard polystyrene samples.
[e] Reaction run at $-5°$ C.

The polymerizations of monomers (I), (II), and (III) by both initiators gave soluble polymers. FIG. 1 shows the molecular weight distributions (MWDs) of the polymers so obtained. The polymerization of monomers (I), (II), and (III) by $BF_3OEt_2$ gave broad MWDs, which are normal for cationic polymerization reactions ($\overline{M}w/\overline{M}n = 2.50$-3.00). In contrast the $HI/I_2$ initiated polymers had very narrow MWDs ($\overline{M}w/\overline{M}n = 1.20$-1.40).

Figure 5:
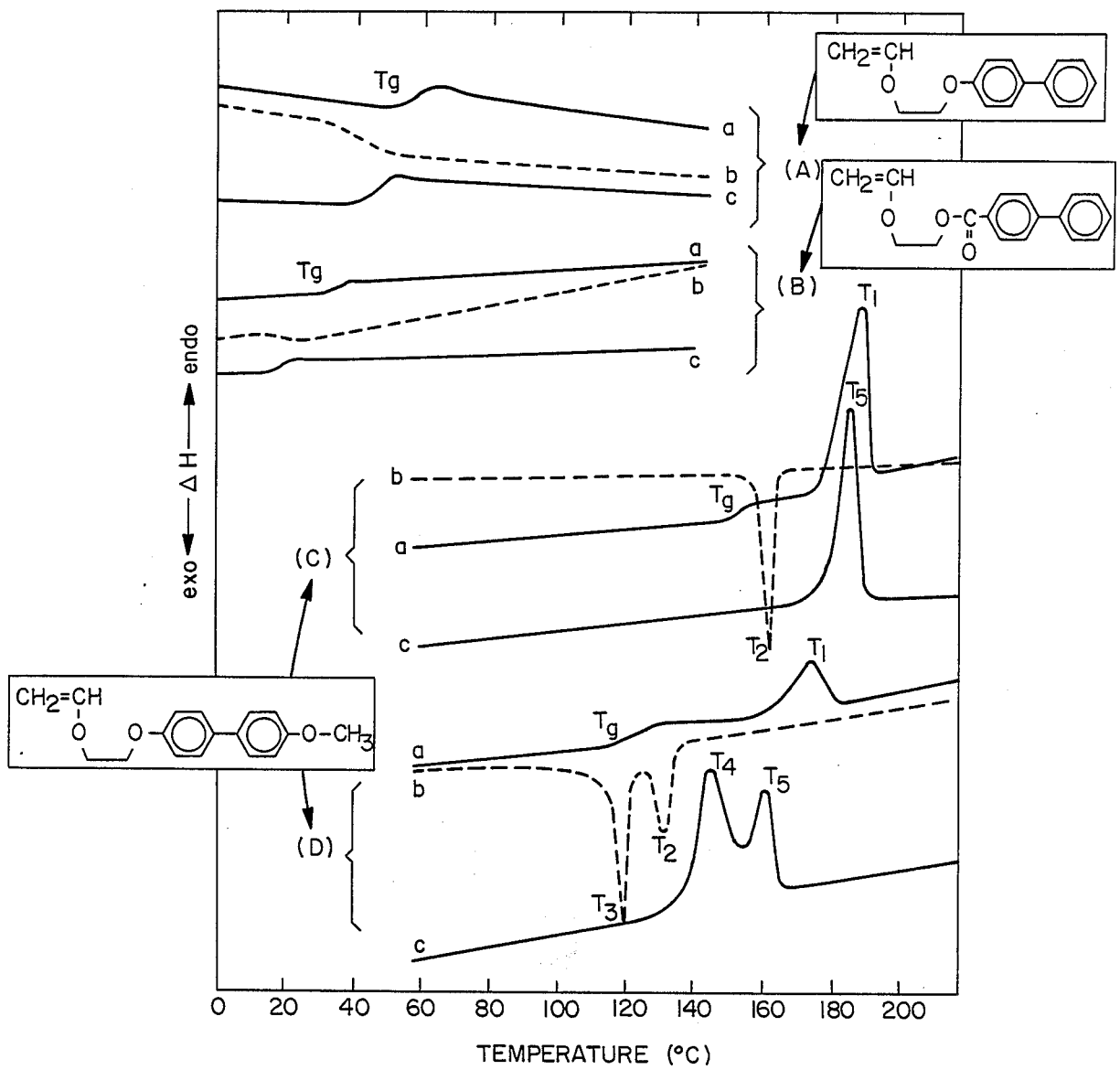
FIG. 5 shows DSC thermograms of Polymers I, II and III.

The living character of the polymerization reactions of (I), (II), and (III) initiated by $HI/I_2$ system was revealed not only by the monodisperse MWD shown in FIG. 1, but also by the relationship between polymerization reactants and number average molecular weight $(\overline{M})n$. Thus the $\overline{M}n$ of the polymers increased proportionally obtained by the $HI/I_2$ initiator are shown in FIG. 5-(A) and -(B). Both polymers showed only a Tg (at 56° C. and 32° C., respectively), and neither polymer showed any indication of the presence of crystalline or liquid crystalline endotherm in the thermograms. Thus, both appeared to be totally amorphous in both solid and melt states.

Polymer III

In contrast, the thermograms of Polymer III showed at least one endotherm and in some cases two, as seen in FIG. 5-(C) and -(D) for the DSC thermograms of Polymer III obtained by initiation with $BF_3OEt_2$ and $HI/I_2$, respectively. Thermal and thermodynamic data for all samples of Polymer III are set forth in Table 3.

TABLE 3

Thermal Properties of Broad and Narrow (10-13) Distribution Samples of Polymer III

| Sample No. | Heating Cycle[a] Mw/Mn | $T_g$ | $T_{s-n}$ | $T_{n-i}$ | Cooling Cycle[b] $T_{i-n}$ | $T_{n-s}$ | $\Delta H_{s-n}$ | $\Delta H_{n-i}$ | $\Delta H_{s-n} + \Delta H_{n-i}$ | $\Delta S_{s-n}$ | $\Delta S_{n-i}$ | $\Delta S_{s-n} + \Delta S_{n-i}$ |
|---|---|---|---|---|---|---|---|---|---|---|---|---|
| (9) | 6.7/2.5 | 157 | — | 190 (185) | 160 | — | — | 11.9 | 11.9 | — | 2.6 | 2.6 |
| (10) | 6.0/1.2 | 138 | — (149) | 171 (161) | 130 | 123 | 5.3 | 6.9 | 12.2 | 1.3 | 1.6 | 2.8 |
| (11) | 4.3/1.2 | 134 | — (145) | 174 (160) | 133 | 121 | 7.4 | 4.6 | 12.0 | 1.8 | 1.1 | 2.8 |
| (12) | 2.4/1.4 | 130 | — (143) | 169 (159) | 138 | 123 | 8.1 | 3.9 | 12.0 | 1.9 | 0.9 | 2.8 |
| (13) | 1.8/1.3 | 128 | — (140) | 170 (160) | 140 | 122 | 8.3 | 4.1 | 12.4 | 2.0 | 0.9 | 3.0 |

Mn × 10³¹³ ΔH (cal/g); ΔS × 10² (cal/g·K)

[a]Taken from the first heating cycle; numbers in parentheses indicate the transition temperatures taken from the second heating cycle.
[b]Taken from the first cooling cycle.
[c]Taken from the second heating cycle.

Identification of Mesophase

The $BF_3OEt_2$-initiated polymer showed a glass transition ($t_g = 157°$ C.) and an endothermic transition peak ($T_1 = 190°$ C.) in the first heating cycle, and an exothermic transition peak ($T_2 = 160°$ C.) in the first cooling cycle. An endothermic transition peak ($T_5 = 185°$ C.) was also observed in the second heating cycle. On the other hand, the transition values of the $HI/I_2$-initiated polymers were different from those of the former. A glass transition ($T_g = 134°$ C.) and an endothermic transition peak ($T_1 = 174°$ C.) in the first heating cycle, two exothermic transition peaks ($T_2 = 133°$ C. and $T_3 = 121°$ C.) in the first cooling cycle and two endothermic transition peaks ($T_4 = 145°$ C. and $T_5 = 160°$ C.) in the second heating cycle were observed. After the first heating cycle, subsequent cycles on each polymer gave virtually identical DSC thermograms.

In order to identify the transition peaks ($T_1$-$T_5$) in the DSC thermograms of the polymer, the texture observations were carried out with a polarizing microscope for Polymer III obtained with $BF_3OEt_2$. The sample showed thread-like textures characteristic of the nematic phase at the temperature just below $T_2$ in the cooling cycle and just below $T_5$ (or $T_1$) in the heating cycle. On the other hand, the Polymer III sample obtained with $HI/I_2$ showed both nematic thread-like textures between $T_2$ and $T_3$ (also between $T_4$ and $T_5$ and just below $T_1$) and focal-conic textures characteristic of the smectic phase at temperatures just below $T_3$ (or $T_4$). Both samples obtained with $BF_3OEt_2$ and $HI/I_2$ did not clearly show glass transitions in the DSC thermograms after the first heating cycle, although the polymer recovered by the precipitation which had not been melted showed a $T_g$. Thus, it appears that the glass transition overlaps with $T_2$ (or $T_5$) in the $BF_3OEt_2$ initiated sample and with $T_3$ (or $T_4$) in the $HI/I_2$ initiated sample.

Figure 6:
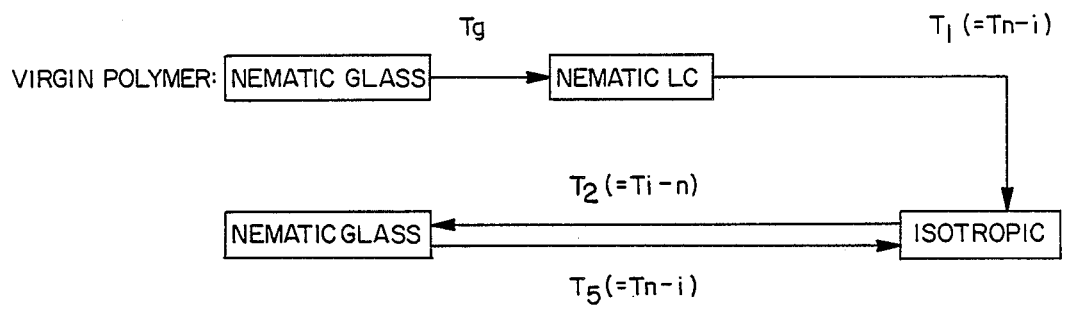
FIG. 6 is a schematic representation of the thermal transitions for polymers with broad molecular weight distributions and narrow molecular weight distributions.
Figure 6:
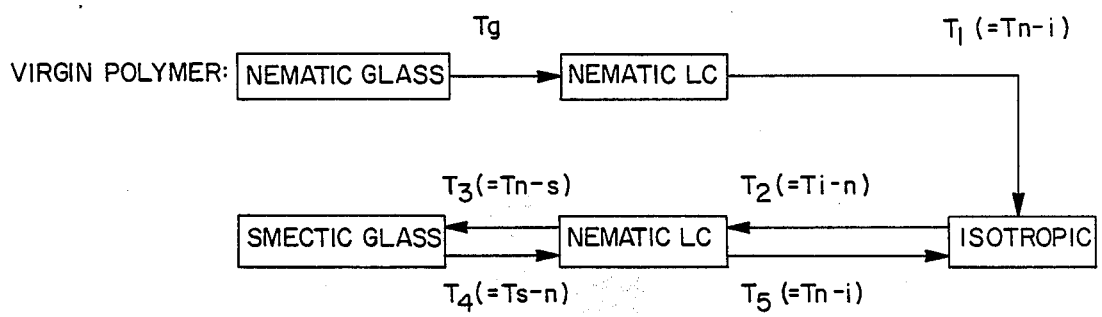

Each transition peak ($T_1$-$T_5$) and each phase before and after the peak could be identified as shown in FIG. 6 in which $T_{x-y}$ indicates the transition temperature from x-phase to y-phase. Observations on a capillary melting point apparatus also gave the same results as described above.

Molecular Weight Dependency

The molecular weight ($\overline{M}n$) dependency on the transition points of Polymer III are shown by the data in Table 3. Monodisperse-MW Polymer III, in the MW range 1,800-6,000, showed only a slight MW effect on $T_g$, $T_{s-n}$, and $T_{i-n}$. Thus, $T_g$ and $T_{s-n}$ increased and, surprisingly, $T_{i-n}$ decreased with increasing $\overline{M}n$, but $T_{n-i}$ and $T_{n-s}$ were not affected with the molecular weight.

The data in Table 3 also indicates that there is some molecular weight dependency on the thermodynamic parameters, $\Delta H$ and $\Delta S$. That is, $\Delta H_{s-n}$ and $\Delta S_{s-n}$ decreased, and $\Delta H_{n-i}$ and $\Delta S_{n-i}$ increased with increasing $\overline{M}n$, but the summations $\Delta H_{s-n} + \Delta H_{n-i}$ and $\Delta S_{s-n} + \Delta S_{n-i}$ were not affected by changes in $\overline{M}n$.

For the broad MWD sample of Polymer III, Sample No. 9, which was obtained by $BF_3OEt_2$, all of the observed transition temperatures were higher than those of the narrow MWD sample, but the $\Delta H$ and $\Delta S$ (from nematic glass phase to isotropic phase) were almost the same level as the values of $\Delta H_{s-n} + \Delta H_{n-i}$ and $\Delta S_{s-n} + S_{n-i}$, respectively, of the latter. One possible explanation of this is that $T_g$ and $T_{n-i}$ are affected by the higher molecular fraction, and considering the inverse relationship for the narrow fraction polymers $T_{i-n}$ is affected by the lower molecular weight fraction in the broad MWD (see FIG. 1). In contrast, the sum of $\Delta H$ and $\Delta S$ for the transition from the glass phase to the isotropic phase was not affected by the molecular weight of the polymer, as seen in the monodisperse polymer series in Table 3.

One possible reason why the broad MWD Polymer III did not show either a nematic mesophase or a smectic glass phase after the first heating cycle could be the adverse effects on phase formation by the higher molecular weight portion of the broad MWD. Thus, the nematic mesophase temperature range became narrow with increasing the molecular weight, as seen in the monodisperse polymer series, and consequently the higher molecular weight portion caused the direct transition from isotropic phase to nematic glass phase without allowing formation of the smectic mesophase. On the other hand, monodisperse Polymer III, obtained by $HI/I_2$ could not be affected in that manner.

EXAMPLES IV-VI

Cationic polymerizations of 2-(4'-cyano-4-biphenyloxy) ethyl vinyl ether having the formula (IV)

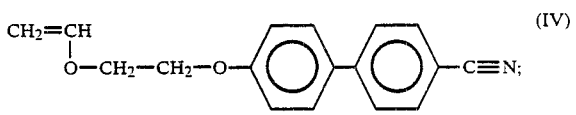

2-(4'-ethoxy-4-biphenyloxy) ethyl vinyl ether having the formula (V)

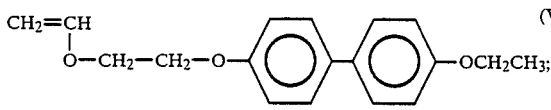

and 2-(4'-hexoxy-4-biphenyloxy) ethyl vinyl ether having the formula (VI)

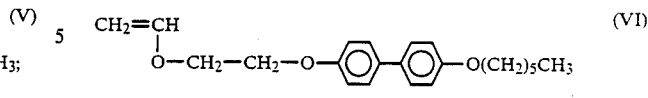

were carried out using HI/ZnI$_2$, HI/I$_2$ and/or BF$_3$O-Et$_2$ initiator systems under the conditions set forth in Tables 4, 5 and 6, respectively.

TABLE 4

Cationic Polymerization of

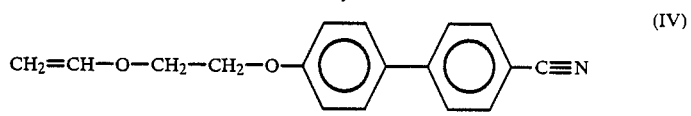

| Sample No. | Initiator (mM), Solvent & Temp. | [M]$_O$ (M) | Reaction Time (Hr) | $\overline{M}n \times 10^{-3}$ Calcd.[a] | Observed[b] | $\overline{M}w/\overline{M}n$[b] | $\overline{DP}n$[c] |
|---|---|---|---|---|---|---|---|
| (14) | HI/ZnI$_2$(11.9/0.2) CH$_2$Cl$_2$, −5° C. | 0.05 | 91 | 1.1 | 1.3 | 1.01 | 4.9 |
| (15) | HI/I$_2$(12.1/0.2) CH$_2$Cl$_2$, −5° C. | 0.11 | 20 | 2.4 | 2.1 | 1.1 | 7.9 |
| (16) | HI/I$_2$(7.2/0.2) CH$_2$Cl$_2$, −5° C. | 0.11 | 20 | 3.9 | 3.5 | 1.1 | 13.2 |
| (17) | HI/ZnI$_2$(3.1/0.2) CH$_2$Cl$_2$, −5° C. | 0.9 | 115 | 7.7 | 7.3 | 1.2 | 27.5 |
| (18) | BF$_3$OEt$_2$(2.5) CH$_2$Cl$_2$, −5° C. | 0.5 | 24 | — | 4.4 | 2.1 | 16.6 |

[a]Calcd. $\overline{M}n$ = (MW of monomer) × ([M] consumed/[HI]$_O$), all reaction conversions were close to 100%.
[b]Determined by GPC calibrated with standard polystyrene samples.
[c]Number-average degree of polymerization from $\overline{M}n$ (observed).

TABLE 5

Cationic Polymerization of

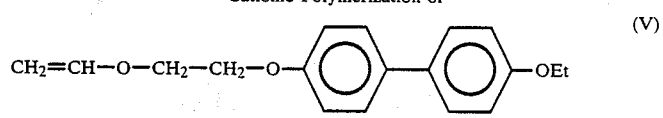

| Sample No. | Initiator (mM), Solvent & Temp. | [M]$_O$ (M) | Reaction Time (Hr) | $\overline{M}n \times 10^{-3}$ Calcd.[a] | Observed[b] | $\overline{M}w/\overline{M}n$[b] | $\overline{DP}n$[c] |
|---|---|---|---|---|---|---|---|
| (19) | HI/ZnI$_2$(11.1/0.4) Toluene, 40° C. | 0.09 | 24 | 2.3 | 2.0 | 1.1 | 7.0 |
| (20) | HI/I$_2$(10.1/0.2) CH$_2$Cl$_2$, −5° C. | 0.10 | 24 | 2.8 | 2.6 | 1.1 | 9.2 |
| (21) | HI/ZnI$_2$(3.1/0.2) CH$_2$Cl$_2$, −5° C. | 0.09 | 48 | →(5.3)[d] Insoluble in CHCl$_3$ | | (1.3)[d] | (18.7)[d] |
| (22) | BF$_3$OEt$_2$(2.5) CH$_2$Cl$_2$, −5° C. | 0.05 | 24 | Some part was insoluble in CHCl$_3$ →(4.0)[e] | | (2.5)[e] | (14.1)[e] |
| (22H) | (CHCl$_3$ insoluble part of (22)) 77 wt % | | | →(5.5)[f] | | (2.2)[f] | (19.4)[f] |
| (22L) | (CHCl$_3$ soluble part of (22)) 23 wt % | | | — | 2.1 | 1.3 | 7.4 |

[a]Calcd. $\overline{M}n$ = (MW of monomer) × ([M] consumed/[HI]$_O$), all reaction conversions were close to 100% except Sample No. 21 (= 64%).
[b]Determined by GPC calibrated with standard polystyrene samples.
[c]Calculated from $\overline{M}n$ (observed).
[d]Polymer was precipitated at the monomer conversion 64%; these values were calculated assuming that the living polymerization proceeded just before the precipitation.
[e]Calculated from the CHCl$_3$ soluble part data and the assumed value of $\overline{M}w/\overline{M}n$ (2.5).
[f]Calculated from the overall and CHCl$_3$ soluble part data.

TABLE 6

Cationic Polymerization of

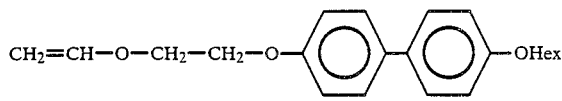

| Sample No. | Initiator (mM), Solvent & Temp. | $[M]_O$ (M) | Reaction Time (Hr) | $\overline{Mn} \times 10^{-3}$ Calcd.[a] | Observed[b] | $\overline{Mw}/\overline{Mn}$[b] | $\overline{DPn}$[c] |
|---|---|---|---|---|---|---|---|
| (23) | HI/ZnI$_2$(5.7/0.3) CH$_2$Cl$_2$, −5° C. | 0.05 | 92 | 3.0 | 2.5 | 1.02 | 7.4 |
| (24) | HI/ZnI$_2$(10.1/0.4) Toluene, 40° C. | 0.10 | 24 | 3.4 | 3.0 | 1.04 | 8.8 |
| (25) | BF$_3$OEt$_2$(2.5) CH$_2$Cl$_2$, −5° C. | 0.05 | 24 | — | 2.8 | 2.6 | 8.2 |

[a]Calcd. $\overline{Mn}$ = (MW of monomer) × ([M] consumed/[HI]$_O$), all reaction conversions were close to 100%.
[b]Determined by GPC calibrated with standard polystyrene samples.
[c]Calculated from $\overline{Mn}$ (observed).

The number average molecular weights ($\overline{Mn}$), the molecular weight distribution ($\overline{Mw}/\overline{Mn}$) and the degree of polymerization ($\overline{DPn}$) for the so-formed polymers are also set forth in Tables 4–6. The texture observations were also carried out with a polarizing microscope for all samples of polymer IV, V and VI, in order to identify the mesophase.

The thermal and thermodynamic properties of the resulting polymers are set forth in Tables 7, 8 and 9, respectively, in which $T_{x-y}$ indicates the transition temperature from x-phase to y-phase (i: isotropic, s: smectic, n: nematic).

TABLE 7

Thermal Properties of

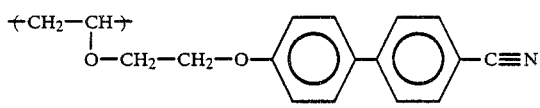

| Sample No. | $\overline{Mn} \times 10^{-3}$ $\overline{Mw}/\overline{Mn}$ | Heating Cycle[a] $T_g$ | $T_{s-i}$ | Cooling Cycle[b] $T_{i-s}$ | $T_g$ | Thermodynamic Parameters[c] $\Delta Ha$-b(cal/g)/$\Delta Sa$-b × 10$^2$(cal/g · K) |
|---|---|---|---|---|---|---|
| (14) | 1.3<br>1.01 | 60<br>—[d] | 100–180<br>(115) | 96 | —[d] | s ⟶ i: 8.1/2.1 |
| (15) | 2.1<br>1.1 | 59<br>—[d] | 130–210<br>(116) | 97 | —[d] | s ⟶ i: 5.1/1.3 |
| (16) | 3.5<br>1.2 | 72<br>(57) | — | — | 66 | |
| (17) | 7.3<br>1.2 | 78<br>(72) | — | — | 65 | |
| (18) | 4.4<br>2.1 | 83<br>(77) | — | — | 76 | |

[a]Taken from the first heating cycle; numbers in parentheses indicate the transition temperatures taken from the second heating cycle.
[b]Taken from the first cooling cycle.
[c]Taken from the second heating cycle.
[d]$T_g$ overlapped with $T_{s-i}$ or $T_{i-s}$.

TABLE 8

Thermal Properties of $$+CH_2-CH+$$
$$|$$
$$O-CH_2-CH_2-O-\bigcirc-\bigcirc-OEt$$

| Sample No. | $\overline{M}_n \times 10^{-3}$ $\overline{M}_w/\overline{M}_n$ | Thermal Transitions (°C.) by DSC | | | | | | Thermodynamic Parameters[c] $\Delta H_{a-b}(cal/g)/\Delta S_{a-b} \times 10^2(cal/g \cdot K)$ |
|---|---|---|---|---|---|---|---|---|
| | | Heating Cycle[a] | | | Cooling Cycle[b] | | | |
| | | $T_g$ | $T_{s-n}$ | $T_{n-i}$ | $T_{i-n}$ | $T_{n-s}$ | $T_g$ | |
| (19) | 2.0<br>1.1 | 122<br>(141) | —<br>(177) | 37-187<br>(182) | 176 | 160 | 120 | s ⟶ n: 9.4/2.1   n ⟶ i: 2.2/0.5 |
| (20) | 2.6<br>1.1 | 141<br>(147) | —<br>(175) | 181<br>(183) | 170 | 152 | 123 | s ⟶ n: 9.4/2.1   n ⟶ i: 3.1/0.7 |
| (21) | [5.3][d]<br>[1.3][d] | 173<br>(162) | —<br>(176) | 194<br>(187) | 168 | 153 | 139 | s ⟶ n: 5.8/1.3   n ⟶ i: 6.1/1.3 |
| (22)-overall | [4.0][d]<br>[2.5][d] | 195<br>—[e] | — | 209<br>(212) | 191 | — | —[e] | n ⟶ i: 13.1/2.7 |
| (22H)<br>High MW part | [5.5][d]<br>[2.2][d] | 202<br>—[e] | — | 210<br>(211) | 191 | — | —[e] | n ⟶ i: 15.2/3.1 |
| (22L)<br>Low MW part | 2.1<br>1.3 | 127<br>(144) | —<br>(178) | —<br>(185) | 175 | 158 | 125 | s ⟶ n: 9.0/2.0   n ⟶ i: 2.2/0.5 |

[a]Taken from the first heating cycle; numbers in parentheses indicate the transition temperatures taken from the second heating cycle.
[b]Taken from the first cooling cycle.
[c]Taken from the second heating cycle.
[d]Hypothetical values.
[e]$T_g$ overlapped with $T_{n-i}$ or $T_{i-n}$.

TABLE 9

Thermal Properties of $$+CH_2-CH+$$
$$|$$
$$O-CH_2-CH_2-O-\bigcirc-\bigcirc-OHex$$

| Sample No. | $\overline{M}_n \times 10^{-3}$ $\overline{M}_w/\overline{M}_n$ | Thermal Transitions (°C.) by DSC | | | | Thermodynamic Parameters[c] $\Delta H_{a-b}(cal/g)/\Delta S_{a-b} \times 10^2(cal/g \cdot K)$ |
|---|---|---|---|---|---|---|
| | | Heating Cycle[a] | | Cooling Cycle[b] | | |
| | | $T_g$ | $T_{n-i}$ | $T_{i-n}$ | $T_g$ | |
| (23) | 2.5<br>1.02 | 126<br>(106) | 168<br>(169) | 161 | 105 | n ⟶ i: 8.3/1.9 |
| (24) | 3.0<br>1.04 | 131<br>(111) | 171<br>(156) | 144 | 108 | n ⟶ i: 9.9/2.3 |
| (25) | 2.8<br>2.6 | 127<br>(120) | 148<br>(148) | 135 | —[d] | n ⟶ i: 4.8/1.1 |

[a]Taken from the first heating cycle; numbers in parentheses indicate the transition temperatures taken from the second cycle.
[b]Taken from the first cooling cycle.
[c]Taken from the second heating cycle.
[d]$T_g$ overlapped with $T_{i-n}$.

EXAMPLES VII and VIII

Cationic polymerizations of 2-(8-(4'-cyano-4biphenyloxy)octanoxy) ethyl vinyl ether having the formula (VII)

$$CH_2=CH \qquad (VII)$$
$$|$$
$$O-CH_2CH_2-O+CH_2)_8O-\bigcirc-\bigcirc-C\equiv N;$$

and 2-(2-(2-(4'-ethoxy-4-biphenyloxy)ethoxy)ethoxy) ethyl vinyl ether having the formula (VIII)

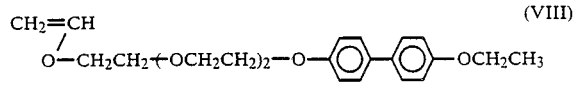
(VIII)

were carried out using HI/ZnI$_2$ or BF$_3$OEt$_2$ initiator systems under the conditions set forth in Table 10. $\overline{\text{Mn}}$, $\overline{\text{Mw}}/\overline{\text{Mn}}$ and $\overline{\text{DPn}}$ for the so-formed polymers are also set forth in Table 10.

TABLE 10

Cationic Polymerization of (VII) and (VIII)$^a$.

| Sample No. | Monomer | Initiator | [M]$_O$ (M) | Reaction Time (Hr) | $\overline{\text{Mn}} \times 10^{-3}$ Calcd.$^b$ | Observed$^c$ | $\overline{\text{Mw}}/\overline{\text{Mn}}$ | $\overline{\text{DPn}}^d$ |
|---|---|---|---|---|---|---|---|---|
| (26) | (VII) | HI/ZnI$_2$(7.0/0.2) | 0.10 | 20 | 5.4 | 5.0 | 1.2 | 13.1 |
| (27) | (VII) | BF$_3$OEt$_2$(5.0) | 0.10 | 24 | — | 6.3 | 2.8 | 16.5 |
| (28) | (VIII) | HI/ZnI$_2$(7.0/0.2) | 0.10 | 18 | 5.3 | 5.1 | 1.3 | 13.7 |
| (29) | (VIII) | BF$_3$OEt$_3$(5.0) | 0.10 | 20 | — | 7.0 | 2.7 | 18.8 |

$^a$All reactions were carried out in CH$_2$Cl$_2$ at $-5°$ C.
$^b$Calcd. $\overline{\text{Mn}}$ = (MW of monomer) × [M] consumed/[HI]$_O$), all reaction conversions were close to 100%.
$^c$Determined by GPC calibrated with standard polystyrene samples.
$^d$Number-average degree of polymerization, calculated from $\overline{\text{Mn}}$ (observed).

The monomers (VII) and (VIII) were obtained by the reactions shown below:

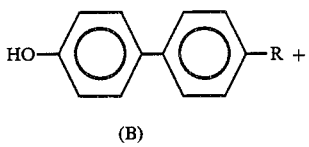

(B)

VII: R = CN
VIII: R = OCH$_2$CH$_3$

For VII: HO$\leftarrow$CH$_2\rightarrow_{\overline{8}}$Br
For VIII: HOCH$_2$CH$_2$OCH$_2$CH$_2$Cl $\xrightarrow{\text{(1) NaOH, N—Bu}_4\text{NHSO}_4}{\text{(2) Na}}$ For VII:
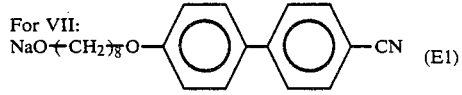 (E1)

For VIII:
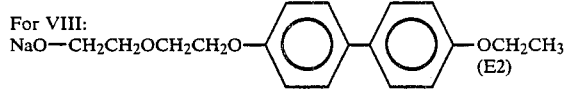 (E2)

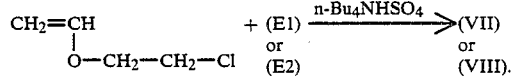

The texture observations for the so-formed polymers were carried out in the same manner as described above. The thermal properties of the resulting polymers are set forth in Table 11.

TABLE 11

Thermal Transitions of Polymer VII and Polymer VIII.

| Sample No. | $\overline{\text{Mn}} \times 10^{-3}$ $\overline{\text{Mw}}/\overline{\text{Mn}}$ | Heating Cycle$^a$ Tg | T$_{s-n}$ | T$_{n-i}$ | Cooling Cycle$^b$ T$_{i-n}$ | T$_{n-s}$ | Tg |
|---|---|---|---|---|---|---|---|
| Polymer VII | | | | | | | |
| (26) | 5.0 / 1.2 | 42 / (40) | — / (102) | 128 / (125) | 113 | 90 | 39 |
| (27) | 6.3 / 2.8 | 60 / (67) | — / (83) | 113 / (108) | 97 | 71 | 53 |
| Polymer VIII | | | | | | | |
| | 5.1 | 40 | — | 124 | 110 | 98 | 37 |
| (28) | 1.3 | (35) | (105) | (118) | | | |
| (29) | 7.0 / 2.7 | 55 / (63) | — / (73) | 109 / (99) | 86 | 65 | —$^c$ |

$^a$Taken from the first heating cycle; numbers in parentheses indicate the transition temperatures taken from the second heating cycle.
$^b$Taken from the first cooling cycle.
$^c$Tg overlapped with T$_{n-s}$.

As shown in the experimental examples described above, a polymer of this invention, having an optically anisotropic phase, comprises recurring units of the formula (1)

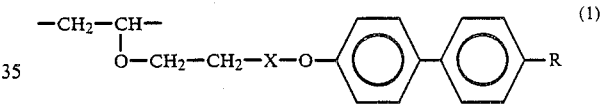
(1)

wherein R is a substantially linear organic substituent in a bulkiness factor greater than about 4 Å, and wherein X is a direct bond, —O$\leftarrow$CH$_2\rightarrow_n$(where n is an integer of 1 to 8) or $\leftarrow$OCH$_2$CH$_2\rightarrow_{\overline{m}}$(where m is 1, 2 or 3), said polymer having a molecular weight distribution ($\overline{\text{Mw}}/\overline{\text{Mn}}$) of less than about 1.4, and obtained by living cationic polymerization using HI/I$_2$ or HI/ZnI$_2$ has special characteristics compared with broad molecular weight distribution ($\overline{\text{Mw}}/\overline{\text{Mn}}$ is more than about 1.5) polymer obtained by conventional initiators, such as BF$_3$OEt$_2$. In particular, such a polymer (i) exhibits anisotropic phases which are not exhibited by the broad molecular weight distribution polymer (e.g., smectic phase of Polymers III, IV or V); and (ii) has a wider temperature range of the liquid crystalline phase than that of a broad molecular weight distribution polymer (e.g., nematic phase of Polymers III, V and VI; and the smectic and nematic phases of Polymers VII and VIII).

Figure 7:
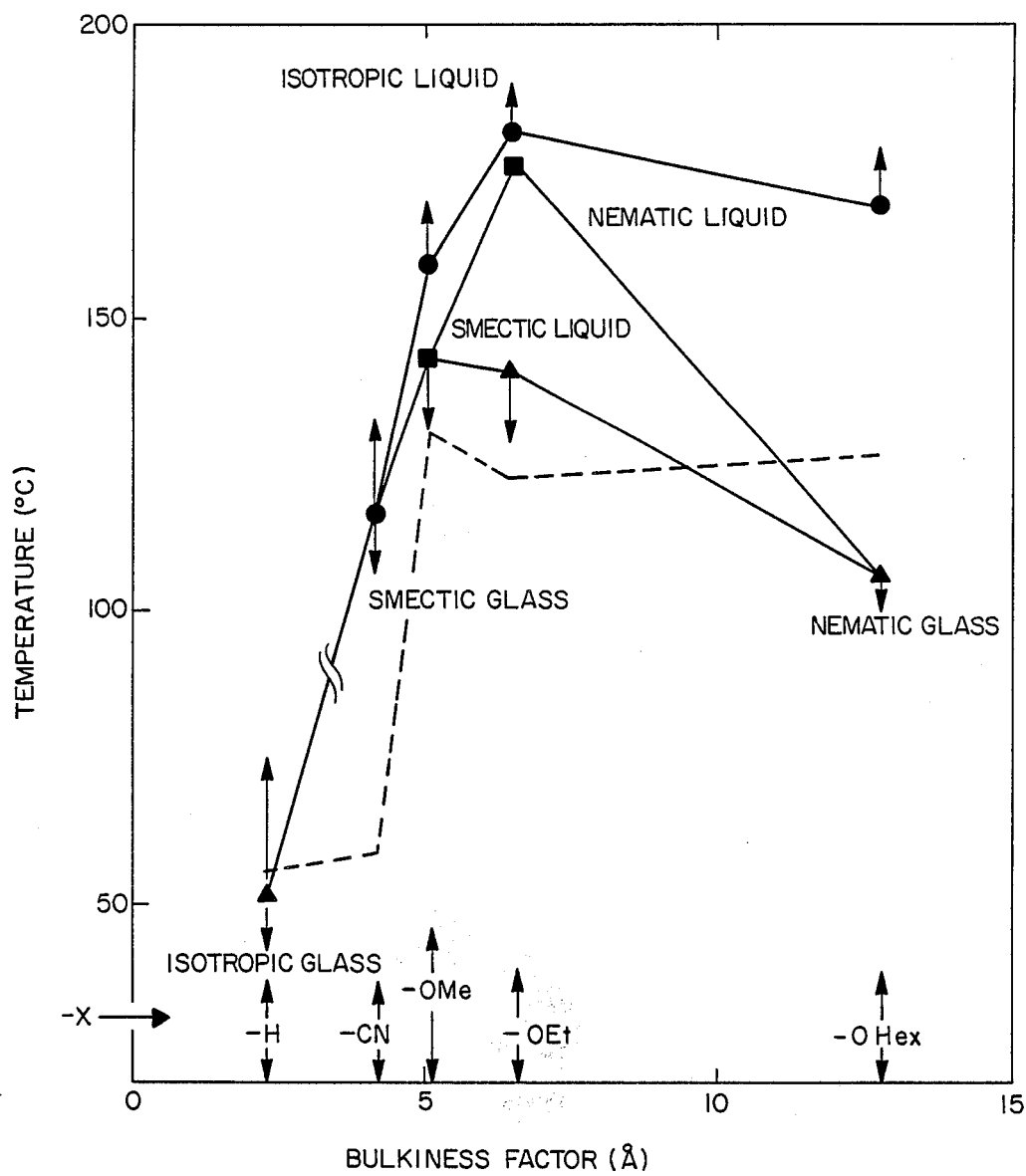
FIG. 7 is a phase diagram of the polymer relative to bulkiness factor for the second heating cycle.
Figure 8:
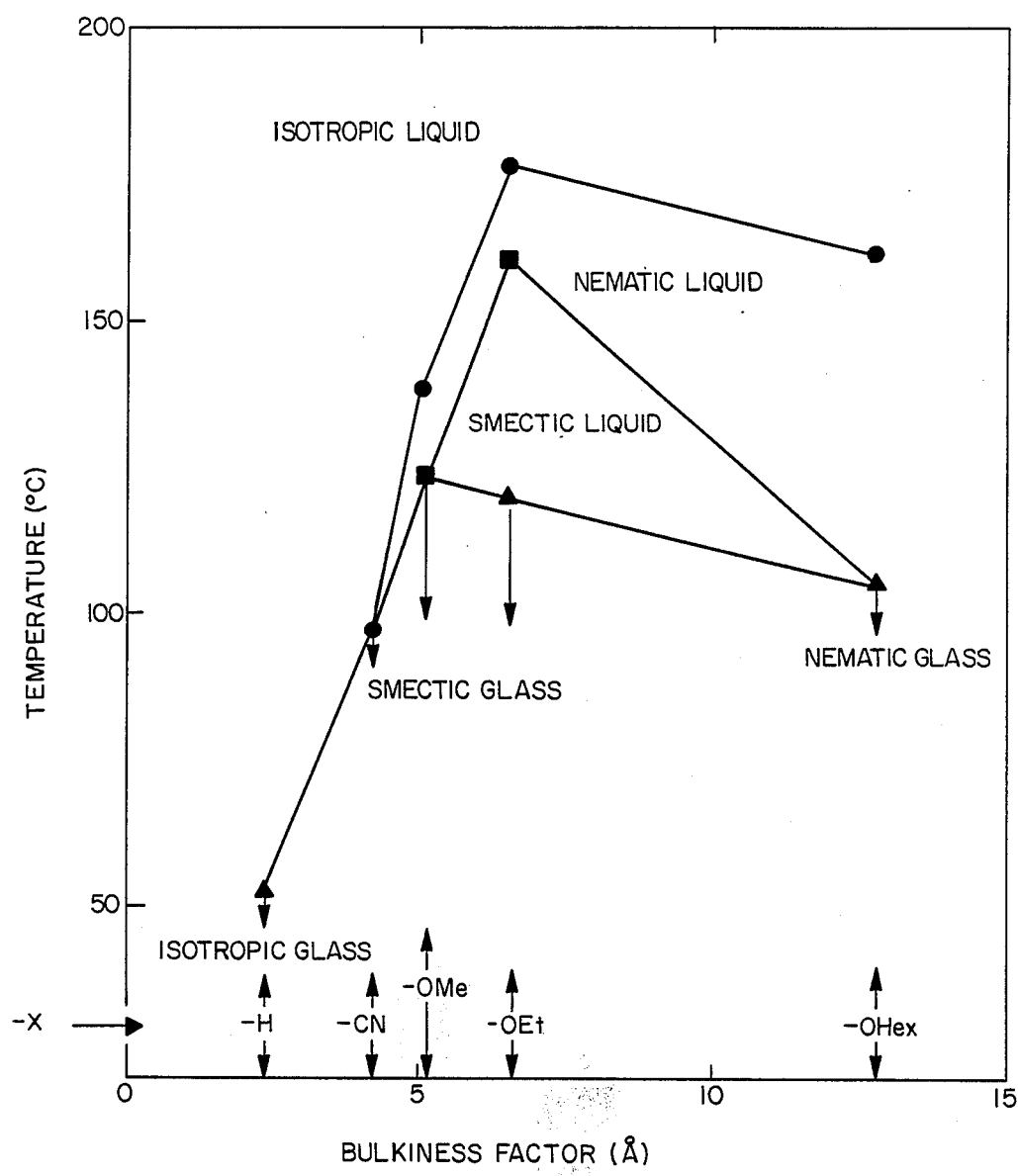
FIG. 8 is a phase diagram of the polymer relative to bulkiness factor for first cooling cycle.
Figure 9:
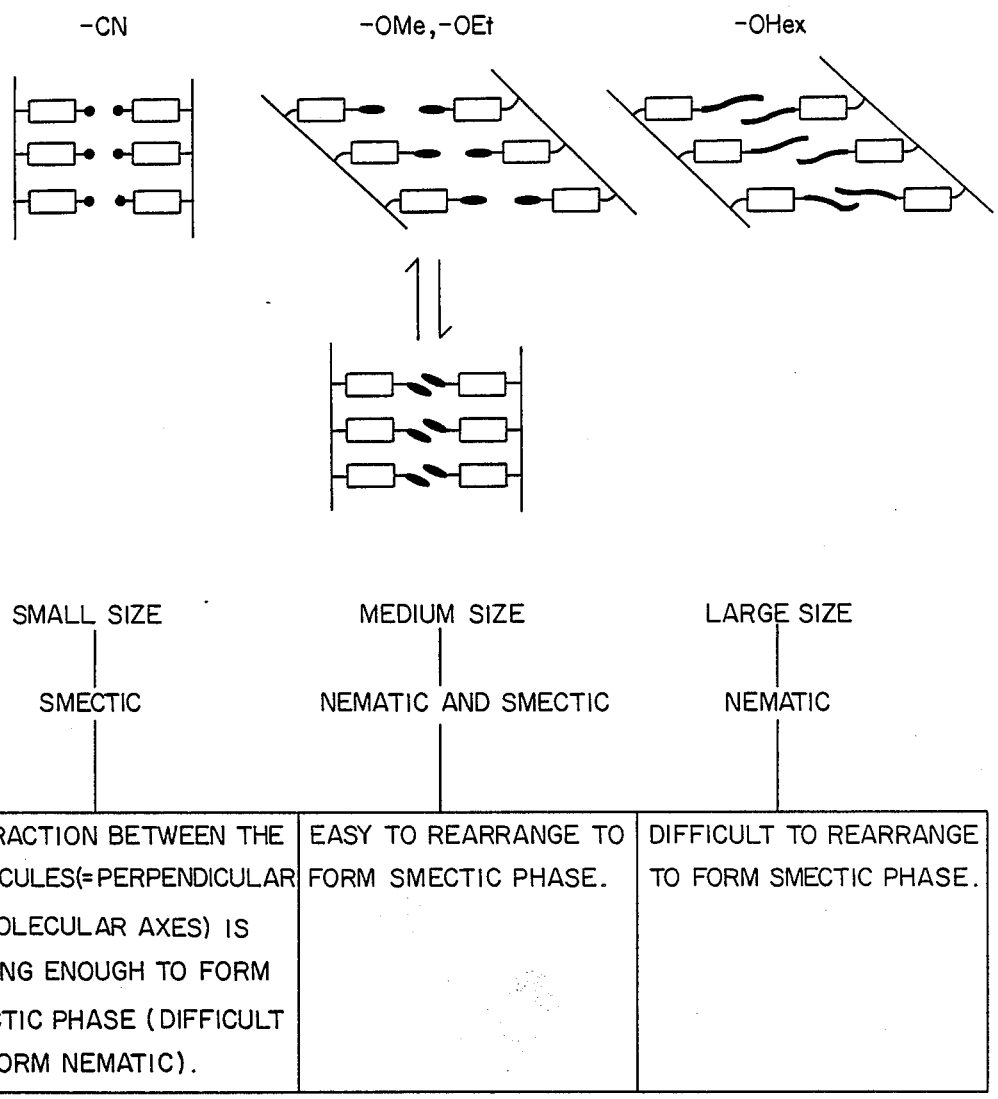
FIG. 9 illustrates the relationship between the size of the 4'-substituent and the type of mesophase.

Based on the thermal properties of the polymers produced by the "living" cationic polymerization technique, phase diagrams as shown in FIGS. 7 and 8 illustrate the relationship between the nature ("bulkiness") of the 4'-substituent on the biphenyl moiety and the anisotropic phase. As may be readily ascertained, optical anisotropy is only exhibited in those cases where the "bulkiness factor" is greater than about 4 Å. Moreover, the "bulkiness factor" also influences the type of mesophase. That is, small substituents, such as —CN, may interact between the molecules perpendicular to the molecular axes with sufficient strength to form a smectic phase (but difficult to form a nematic phase). Medium size substituents, such as methoxy and ethoxy, may be readily rearranged to form both smectic and nematic phases. Large size substituents, such as hexoxy, are difficult to rearrange to form the smectic phase. These relationships are illustrated in FIG. 9.

What is claimed is:

1. A thermotropic polymer capable of forming an optically anisotropic phase comprising recurring units of the formula (1)

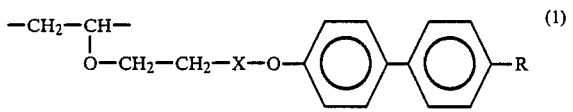

wherein R is a substantially linear organic substituent having a bulkiness factor greater than about 4 Å, and wherein X is a direct bond, $-O-(CH_2)_n-$, where n is an integer of 1 to 8 or $-(OCH_2CH_2)_m-$, where m is 1, 2 or 3, said polymer having a molecular weight distribution ($\overline{Mw}/\overline{Mn}$) of less than about 1.4.

2. The thermotropic polymer as claimed in claim 1, wherein said polymer has a number average molecular weight of from about 1,000 to about 10,000.

3. The thermotropic polymer as claimed in claim 1, wherein said polymer has a number average molecular weight of from about 1,500 to about 6,000.

4. The thermotropic polymer as claimed in claim 1, wherein said polymer has a number average molecular weight of from about 2,000 to about 3,000.

5. The thermotropic polymer as claimed in claim 1, wherein R is an alkoxy of 1 to 6 carbon atoms.

6. The thermotropic polymer as claimed in claim 1, wherein said anisotropic phase comprises a smectic phase.

7. The thermotropic polymer as claimed in claim 1, wherein said anisotropic phase comprises a nematic phase.

8. The thermotropic polymer as claimed in claim 1, wherein said polymer comprises recurring units of the formula (2)

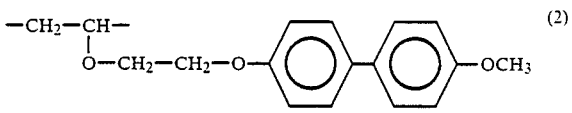

said polymer having a molecular weight distribution ($\overline{Mw}/\overline{Mn}$) of from about 1.2 to about 1.4 and having a number average molecular weight ($\overline{Mn}$) of from about 1,800 to about 6,000.

9. The thermotropic polymer as claimed in claim 1, wherein said polymer comprises recurring units of the formula (3)

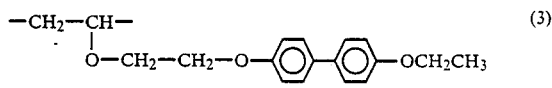

said polymer having a molecular weight distribution of from about 1.1 to about 1.3 and having a number average molecular weight ($\overline{Mn}$) of from about 2,000 to about 5,300.

10. The thermotropic polymer as claimed in claim 1, wherein said polymer comprises recurring units of the formula (4)

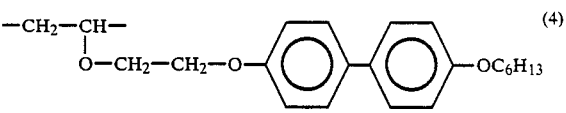

said polymer having a molecular weight distribution ($\overline{Mw}/\overline{Mn}$) of from about 1.02 to about 1.04 and a number average molecular weight ($\overline{Mn}$) of from about 2,500 to about 3,000.

11. The thermotropic polymer as claimed in claim 1, wherein said polymer comprises recurring units of the formula (5)

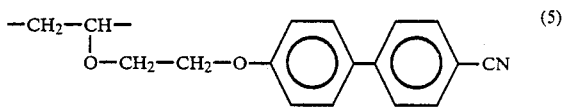

said polymer having a molecular weight distribution ($\overline{Mw}/\overline{Mn}$) of from about 1.01 to about 1.2 and a number average molecular weight ($\overline{Mn}$) of from about 1,000 to about 3,000.

* * * * *